Oct. 8, 1946.    C. E. SWENSON ET AL    2,408,962
ONE-WAY CLUTCH AND BEARING
Filed May 23, 1945
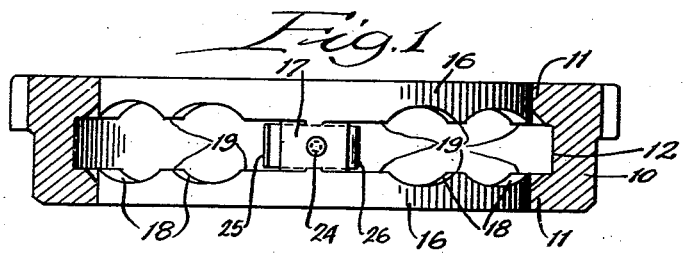
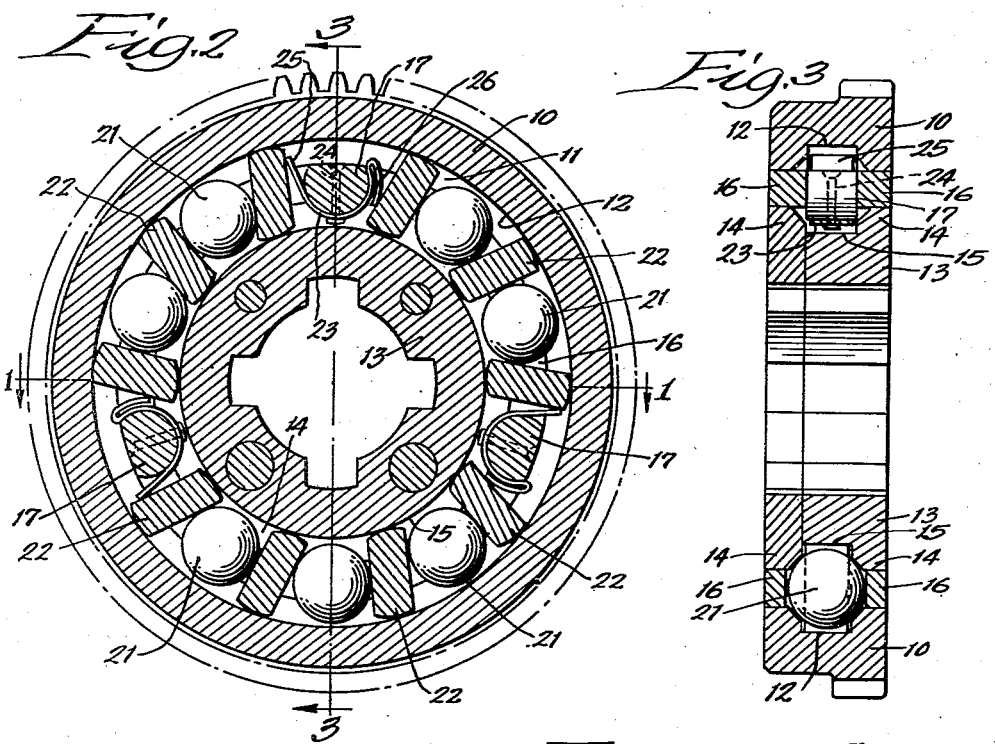
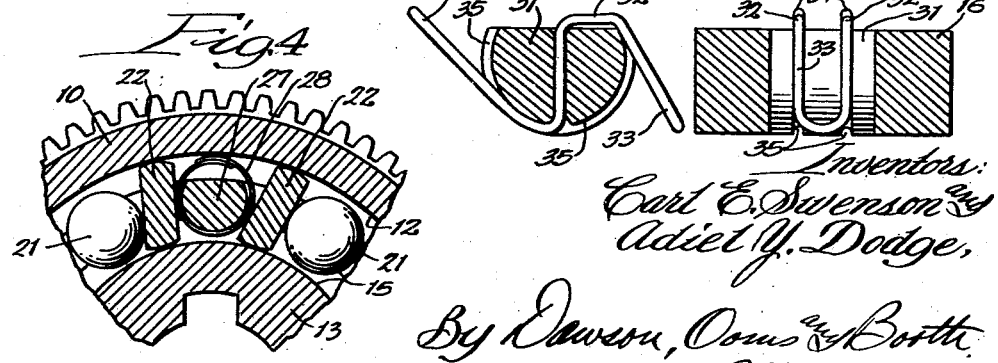
Inventors:
Carl E. Swenson and
Adiel Y. Dodge,
By Dawson, Ooms & Borth
Attorneys.

Patented Oct. 8, 1946

2,408,962

UNITED STATES PATENT OFFICE 2,408,962

ONE-WAY CLUTCH AND BEARING

Carl E. Swenson and Adiel Y. Dodge, Rockford, Ill.

Application May 23, 1945, Serial No. 595,266

10 Claims. (Cl. 192—45.1)

This invention relates to one-way clutches and bearings and more particularly to a combined clutch and bearing unit employing tiltable grippers.

One of the objects of the invention is to provide a one-way clutch and bearing in which the cage is located axially of the races by the bearing members and the grippers are located axially of the races by the cage. In this construction, it is not necessary for the races to guide or locate the grippers so that the race construction is simplified.

Another object of the invention is to provide a one-way clutch and bearing in which bearing balls riding on flanges on the races serve to locate the races axially of each other and to hold the cage in the desired axial position between the races.

Still another object is to provide a one-way clutch and bearing in which the clutch grippers and bearing members are held in contact for uniform operation by elongated springs carried by the cage cross-bars. In one construction, elongated leaf springs are employed which resiliently engage the grippers at radially spaced points respectively to urge the grippers apart and to tilt them toward engaged position. In another construction, wire springs are employed to engage the grippers and are adapted to be pressed into grooves in the crossbars when collapsed to provide a substantially straight outer surface to engage the grippers.

A still further object is to provide a one-way clutch and bearing in which the cage crossbars present full width straight surfaces to the grippers adapted to engage the grippers to limit tilting thereof.

The above and other objects and advantages of the invention will be more readily apparent from the following description when read in connection with the accompanying drawing, in which—

Figure 1 is a partial sectional view on the line 1—1 of Figure 2 with the bearing members omitted and with the cage parts in elevation;

Figure 2 is a central section of the unit of Figure 2;

Figure 3 is a section on the line 3—3 of Figure 2;

Figure 4 is a partial view similar to Figure 2 illustrating an alternative spring construction;

Figure 5 is a section of a crossbar illustrating still another spring construction; and Figure 6 is a partial elevation looking from the right of Figure 5.

In the unit shown in Figures 1 to 3, there is provided an annular outer race 10 formed with side flanges 11 tapered at their inner edges and separated by a groove 12. A complementary inner race 13 preferably split to facilitate assembly is formed with side flanges 14 separated by a groove 15.

Between the races there is arranged a cage having side rings 16 connected by crossbars 17. As shown, three crossbars 17 are provided although more or less could be employed, as desired. The crossbars 17 are of uniform cross section between the side rings and are preferably cylindrical or partially cylindrical, as shown, to present substantially straight cylindrical surfaces at their opposite sides.

The cage side rings are formed as best seen in Figure 1 with alternately wide and narrow portions providing relatively elongated openings 18 connected by straight sided portions 19. The openings are adapted to receive bearing members shown as spherical bearing balls 21 which engage the opposite sides of the openings 18 and which ride on the flanges 11 and 14. The bearing balls 21 thus serve to prevent relative axial movement of the races and by engagement with the sides of the openings 18 accurately locate the cage axially between the races. Alternately arranged with the bearing balls 21 to lie between the relatively narrow straight portions 19 of the cage are a series of tiltable grippers 22 which are adapted when tilted in one direction to bind against the races and when tilted in the opposite direction to free the races for relative rotation. The grippers 22 fit in the grooves 12 and 15 and are preferably slightly narrower than the grooves so that their sides will clear the sides of the grooves. The grippers are held accurately in this position by engagement with the cage side rings so that their ends will engage the bottoms of the grooves. With this construction, it is not necessary that the corners of the grooves be formed accurately since the grippers operate only in the central portions thereof so that machining and grinding of the grooves is substantially simplified.

In order to hold the bearing balls and grippers in contact, the crossbars 18 carry spring members which engage the adjacent grippers to urge them apart and which preferably so contact the grippers that they tend to tilt them toward engaged position. In the form shown in Figures 1 to 3 the spring members comprise elongated leaf springs 23 fitting partially around the crossbars 17 and secured thereto by bolts or rivets 24. The ends of the springs 23 are free and one end 25 extends radially outward to engage the adjacent gripper beyond its radial center. The opposite end is bent back upon itself as indicated at 26 to engage the adjacent gripper radially inward of its center. Thus, the spring acts to tend to urge the grippers apart and at the same time to tend to tilt them toward the position in which they engage the races.

Due to the fact that the crossbars 17 are of uniform section and that the springs 23 are flat leaf springs, if the grippers tend to tilt beyond the working range of the grippers, the springs will be flattened across the crossbars to engage the grippers substantially throughout their full width to limit tilting thereof. With this construction excessive unit pressures between the crossbars and the gripper are avoided. Furthermore, since the springs are supported throughout their width by the crossbars, the springs will not be damaged.

Figure 4 illustrates an alternative spring construction, parts therein corresponding to like parts in Figures 1 to 3 being indicated by the same reference numerals. In this construction, the cage crossbars shown at 27 are loosely intercircled by leaf springs 28 whose ends overlap and which are normally of a greater diameter than the crossbar. In assembling this construction the springs 28 are preferably compressed slightly so that they will urge the adjacent grippers outward. It will be noted that the springs 28 engage the grippers on opposite sides of the crossbars radially beyond and radially within their centers so that they exert a tilting force on the grippers. When these springs are collapsed against the crossbars, they will be supported by the crossbars and will engage the grippers throughout their full width to prevent building up of excessive unit pressures and damage to the parts.

In the construction of Figures 5 and 6, the cage crossbars indicated at 31 are drilled radially to receive wire springs. Preferably, two drilled openings spaced lengthwise of the crossbars are provided to receive two legs of a hairpin type wire spring indicated at 32. After the legs of the spring have been inserted through the drilled openings one end, as indicated at 33, is bent downwardly while the opposite end 34 extends upwardly to engage the adjacent grippers respectively beyond and within their radial centers.

In order that the spring and crossbar may present a substantially straight continuous surface to the grippers when the spring is collapsed, the crossbar is provided with grooves 35 underlying the springs and into which the springs may fit when they are pressed against the crossbar. In this way, damage to the springs is prevented and a substantially straight surface continuous throughout the full width of the grippers is presented to the grippers to limit tilting thereof.

While several embodiments of the invention have been shown and described in detail, it will be understood that these are illustrative only and are not to be taken as a definition of the scope of the invention, reference being had for this purpose to the appended claims.

What is claimed is:

1. A one-way clutch and bearing construction comprising inner and outer races having side flange portions separated by grooves, bearing members riding on the flanges and axially located relative to the races by the flanges, a cage having side rings engaging the bearing members and axially located relative to the races by the bearing members, and tiltable grippers engageable with the bottoms of the grooves, the grippers engaging the cage side rings and being located thereby between the sides of the grooves.

2. A one-way clutch and bearing construction comprising inner and outer races having side flange portions separated by grooves, bearing members riding on the flanges and axially located relative to the races by the flanges, a cage having side rings engaging the bearing members and axially located relative to the races by the bearing members, tiltable grippers arranged alternately with the bearing members and engaging the cage side rings to be held thereby between the sides of the grooves, cage crossbars connecting the side rings and lying between certain adjacent ones of the grippers, and springs carried by the crossbars engaging the adjacent grippers and tending to tilt them toward their engaging position.

3. A one-way clutch and bearing construction comprising inner and outer races having side flange portions separated by grooves, bearing members riding on the flanges and axially located relative to the races by the flanges, a cage having side rings engaging the bearing members and axially located relative to the races by the bearing members, tiltable grippers arranged alternately with the bearing members and engaging the cage side rings to be held thereby between the sides of the grooves, cage crossbars connecting the side rings and lying between certain adjacent ones of the grippers, and elongated springs carried by the crossbars engaging the adjacent grippers to urge them apart and tending to tilt them toward their engaged positions.

4. A one-way clutch and bearing construction comprising inner and outer races having side flanges spaced by grooves, a cage between the races having side rings connected by crossbars, bearing balls and tiltable grippers alternately arranged in the cage with grippers lying on opposite sides of the crossbars, the bearing balls riding on the race flanges and engaging the cage side rings to locate the cage axially of the races and the cage side rings engaging the grippers to locate the grippers between the sides of the grooves, and elongated springs overlying and carried by the crossbars to engage the adjacent grippers and urge them apart.

5. A one-way clutch and bearing construction comprising inner and outer races having side flanges spaced by grooves, a cage between the races having side rings connected by crossbars, bearing balls and tiltable grippers alternately arranged in the cage with grippers lying on opposite sides of the crossbars, the bearing balls riding on the race flanges and engaging the cage side rings to locate the cage axially of the races and the cage side rings engaging the grippers to locate the grippers between the sides of the grooves, and leaf springs secured to and at least partially enveloping the crossbars and engaging the adjacent grippers to urge them apart, the grippers pressing the leaf springs against the crossbars throughout the spring width to limit tilting of the grippers.

6. A one-way clutch and bearing construction comprising a cage having annular side rings connected by spaced crossbars, bearing member and tiltable grippers alternately arranged between the crossbars with the grippers adjacent the crossbars, and elongated springs secured intermediate their ends to the crossbars and having their ends turned in and out respectively to engage the adjacent grippers to urge them apart.

7. A one-way clutch and bearing construction comprising a cage having annular side rings connected by spaced crossbars, bearing members and tiltable grippers alternately arranged between the crossbars with the grippers adjacent the crossbars, and elongated leaf springs secured to and partially encircling the crossbars, the springs being turned outwardly at one end and inwardly at the other to engage the adjacent grippers respectively radially beyond and radially inside of their centers.

8. A one-way clutch and bearing construction comprising a cage having annular side rings connected by spaced crossbars, bearing members and tiltable grippers alternately arranged between the crossbars with the grippers adjacent the crossbars, and leaf springs loosely encircling the crossbars and resiliently engaging the adjacent grippers.

9. A one-way clutch and bearing construction comprising a cage having annular side rings connected by spaced crossbars, bearing members and tiltable grippers alternately arranged between the crossbars with the grippers adjacent the crossbars, and elongated wire springs secured to the crossbars and extending beyond the sides thereof resiliently to engage the adjacent grippers, the crossbars being grooved to receive the springs to present a substantially straight surface to the grippers across the full width thereof when the springs are pressed against the crossbars.

10. A one-way clutch and bearing construction comprising a cage having annular side rings connected by spaced crossbars, bearing members and tiltable grippers alternately arranged between the crossbars with the grippers adjacent the crossbars, and elongated wire springs passing through openings in the crossbars and having their ends turned in and out respectively to engage the adjacent grippers and urge them toward their engaged position.

CARL E SWENSON.
ADIEL Y. DODGE.